United States Patent [19]

Holland

[11] Patent Number: 4,479,511
[45] Date of Patent: Oct. 30, 1984

[54] ONE-MAN BRAKE CHECK VALVE AND COUPLER ASSEMBLY

[75] Inventor: Marion D. Holland, Louisville, Ky.

[73] Assignee: Robert E. Robbins, Elizabethtown, Ky.

[21] Appl. No.: 380,650

[22] Filed: May 21, 1982

[51] Int. Cl.³ .............................................. F16L 37/28
[52] U.S. Cl. ................................. 137/614.2; 137/614; 285/327
[58] Field of Search ...................... 137/614.2, 164, 231; 285/327; 251/346

[56] References Cited

U.S. PATENT DOCUMENTS

| | | | |
|---|---|---|---|
| 1,564,965 | 12/1925 | Kraft | 285/327 |
| 1,981,243 | 11/1934 | Newmark et al. | 285/327 |
| 2,056,249 | 10/1936 | Bystricky | 137/614 |
| 2,090,008 | 8/1937 | Newmark et al. | 285/327 |
| 3,318,330 | 5/1967 | Dobbs | 251/346 |
| 3,422,864 | 1/1969 | Allinquant | 137/614 |

FOREIGN PATENT DOCUMENTS 316168  7/1929  United Kingdom ................ 285/327

*Primary Examiner*—A. Michael Chambers
*Attorney, Agent, or Firm*—Richard L. Caslin

[57] ABSTRACT

A combination one-way check valve and coupler assembly is shown for use in bleeding air from the wheel brake cylinders of automobiles and the like. This one-way check valve is adapted to be attached to a standard bleeder valve that is assembled to each wheel brake cylinder. One-way check valves have been used for this purpose before, but the present invention incorporates a coupler means between the one-way check valve and a standard bleeder valve that is positive and reliable in operation. This coupler means is in the form of a threaded nut that is threaded onto the inlet end of the valve body of the one-way check valve. The outermost end of this threaded nut is slotted from one side to create a spaced, three-sided flange that is capable of slipping over and behind the nipple of a standard bleeder valve so that when the nut is tigntened onto the check valve body, the nipple will be drawn into sealing engagement with a recessed valve seat of the inlet end of the check valve body.

3 Claims, 3 Drawing Figures

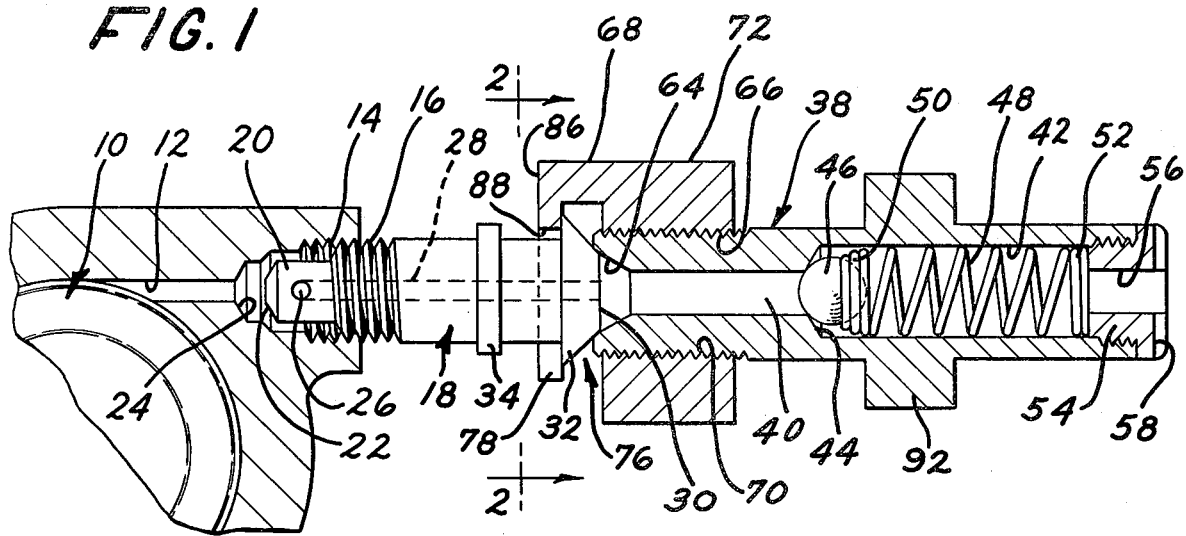
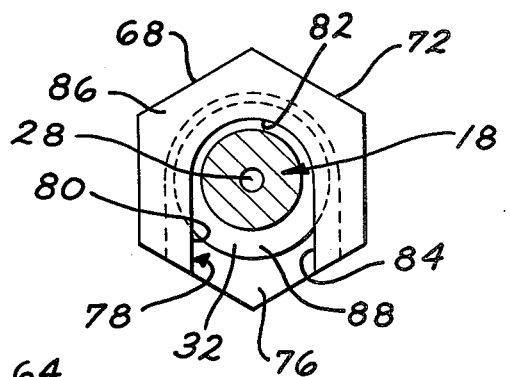
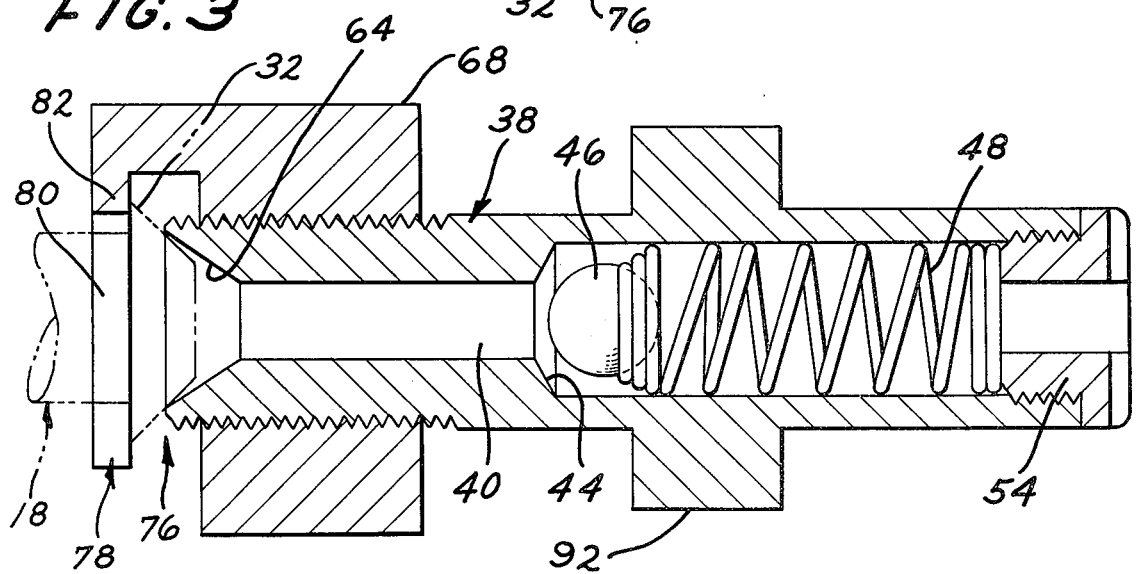

ONE-MAN BRAKE CHECK VALVE AND COUPLER ASSEMBLY

BACKGROUND OF THE INVENTION

1. Field of the Invention

This invention relates to accessories for assisting in bleeding the hydraulic fluid from the brake system of automobiles and trucks. By use of the present invention, it is possible for one person to bleed the brake system through the wheel cylinders of all four wheels simultaneously.

2. Description of the Prior Art

For many years, it has required two people in order to bleed the brake system of hydraulic fluid in order to eliminate any air in the system. Usually, one person sits in the car, behind the wheel, and operates the brake pedal upon command from the other person who is working under the car and operating the bleeder valve, that is furnished with each wheel cylinder, by moving it between a closed and an open position.

It has been a desired objective for many years to devise a brake system that requires but one person to bleed the hydraulic brakes. An early patent is the Gary et al U.S. Pat. No. 2,069,606 which describes a bleeder valve that is furnished with a one-way ball check valve, which check valve prevents air from being drawn in through the discharge end of the bleeder valve when the brake pedal is released. This patent also has a modification that includes the addition of an outlet valve associated with a pipeline leading from the one-way bleeder valve, where this outlet valve serves to release any accumulated air that is present in the hydraulic fluid, thereby eliminating any possibility of the accumulated air returning into the hydraulic brake system.

The Legerski U.S. Pat. No. 2,611,387 describes a valved tool for bleeding brake cylinders. This patent teaches the use of a flexible hose that is connected to the standard bleeder valve, and the free end of the hose is supplied with a small, portable tool having a hollow body formed by a pair of mating cylindrical parts having two ball check valves that are held closed by a common compression spring with a single discharge opening located between the two check valves. The reason for the two ball check valves is that the tool may be used in one direction for use with standard automobiles, and then it could be used in a reverse position for use with larger vehicles, such as trucks, airplanes and the like.

The Wilson U.S. Pat. No. 2,771,093 describes a bleeder valve for hydraulic brake systems, where the bleeder valve has a one-way check valve for preventing the entrance of air into the system during the time the bleeder valve is open and while fluid and air is passing therethrough. This bleeder valve having a one-way check valve is also a one person brake-bleeder system. A drain hose is shown connected to this bleeder valve for discharging into a suitable receptacle.

The Pagano U.S. Pat. No. 3,050,080 describes a bleeder valve having a pair of ball check valves that are held closed by a common intermediate compression spring. The purpose of the outermost check valve is to prevent foreign matter from entering into this one-way check valve.

The Berg U.S. Pat. No. 4,149,560 describes a one-way check valve that may be releasibly attached to the bleeder valve of a wheel brake cylinder. This one-way bleeder valve has a quick disconnect in the form of a rubber casing or jacket that fits over the one-way check valve and is capable of snapping over the external fitting of the bleeder valve.

OBJECTS OF THE PRESENT INVENTION

The principal object of the present invention is to provide a one-man brake check valve and coupler assembly for attachment to a standard bleeder valve so that this assembly will not accidentally become disengaged from the standard bleeder valve during the brake bleeding operation.

A further object of the present invention is to provide a coupler assembly for a one-man check valve in the form of a threaded nut which, when tightened on the check valve body, will draw the standard bleeder valve into sealing engagement with the one-man brake check valve.

A still further object of the present invention is to provide a coupler assembly of the class described with a threaded nut that is slotted from one side so that the nipple of a standard bleeder valve may slip into the side of this threaded nut, and, when the nut is tightened, will become sealed with the valve body of the one-man brake check valve.

SUMMARY OF THE INVENTION

The present invention provides a combination one-way check valve and a coupler assembly for attachment to a standard bleeder valve of a wheel brake cylinder where there is an adjustable coupler means carried by the inlet end of the check valve body. This coupler means is movable between a first, open position when it is adapted to receive the nipple of a standard bleeder valve, and a second, closed position which is adapted to clamp the said bleeder valve nipple into sealing engagement with a valve seat of the check valve body.

BRIEF DESCRIPTION OF THE DRAWINGS

This invention will be better understood from the following description taken in conjunction with the accompanying drawings, and its scope will be pointed out in the appended claims.

FIG. 1 is a cross-sectional view, including a fragment of a hydraulic wheel brake cylinder to which is installed a standard bleeder valve and on which is mounted the one-man brake check valve and coupler assembly of the present invention.

FIG. 2 is a transverse, cross-sectional view taken on the line 2—2 of FIG. 1 through the standard bleeder valve and showing the connection between the nipple of this standard bleeder valve and the adjustable coupler means of the present invention.

FIG. 3 is a cross-sectional view, on an enlarged scale, of the one-man brake check valve and coupler assembly of the present invention showing the ball valve in its open position which is caused by the hydraulic fluid being discharged from the hydraulic brake cylinder.

DESCRIPTION OF THE PREFERRED EMBODIMENTS

Turning now to a consideration of the drawings, and, in particular, to the cross-sectional view of FIG. 1, there is shown a fragment of a hydraulic wheel brake cylinder 10 that is furnished with a bleeder hole 12 that terminates in an internally threaded opening 14 for receiving an externally threaded end 16 of a standard bleeder valve 18. This bleeder valve 18 has a reduced end 20 that is furnished with a bevel 22 that is adapted to seat on the valve seat 24 that is part of the bleeder hole 12 of the brake cylinder 10. The reduced end 20 is also furnished with a transverse opening 26 which communicates with a longitudinal bore hole 28 that extends to the distal end 30 of the bleeder valve 18. The distal end 30 is furnished with a beveled nipple 32 which is adapted under normal conditions to receive the end of a rubber tube (not shown) for catching the hydraulic brake fluid and depositing it into a container (not shown). The mid-body of the bleeder valve 18 is furnished with a wrench-engaging portion 34 for use in opening or closing the bleeder valve 18. Under normal operating conditions of the vehicle, the standard bleeder valve 18 is closed in order to retain the hydraulic fluid in the wheel brake cylinder 10. In order to close this bleeder valve 18, it is merely necessary to turn the bleeder valve until the beveled end 22 of the valve is seated on the valve seat 24. In FIG. 1, this bleeder valve 18 is shown in its open position so that the hydraulic fluid within the wheel brake cylinder 10 passes from the bleeder hole 12 and into the transverse opening 26 and through the longitudinal bore hole 28 to exit from the distal end 30 of the bleeder valve 18.

What has been described above as to the standard bleeder valve 18 is what is furnished on most vehicles. Thus, the bleeding of the hydraulic brake system has, in the past, required the presence of two persons, where one sits in the driver's seat and works the brake pedal, while the other person must be available for opening and closing the standard bleeder valve 18 upon directions from the first person. In order to remove air from the hydraulic brake system, the standard bleeder valve 18 is opened and the brake pedal is depressed. This creates pressure within the brake system, thereby pushing air and/or brake fluid out through the longitudinal bore hole 28 of the bleeder valve 18. However, if the brake pedal is permitted to rise before closing the bleeder valve 18, air will be drawn back into the wheel cylinder 10 and the purpose is defeated. If, on the other hand, the bleeder valve 18 is opened, the brake pedal (not shown) is depressed, and then the bleeder valve 18 is closed before pressure is let up on the brake pedal, a portion of any air in the hydraulic fluid system is effectively removed from the system. It will be understood by those working in this art that such a two-person brake bleeding system is both timeconsuming and expensive from a labor standpoint.

The present invention involves the use of a combination one-way check valve and coupler assembly 38, which is shown assembled to the nipple 32 of the standard bleeder valve 18 in FIG. 1. This check valve and coupler assembly 38 is a tubular member having a longitudinal bore 40 of one size at the left end, and a larger longitudinal bore 42 at the right end thereof. A recessed valve seat 44 is at the innermost end of the larger bore 42 for mating with a ball check valve 46. This ball check valve 46 is normally seated on the valve seat 44 by the action of a compression spring 48. One end 50 of this compression spring bears against the ball check valve 46, while the opposite end 52 of the spring is held compressed by a threaded cap 54 that is inserted into the outer end of the larger bore 42. This cap has a central bore 56 which is open to the outside, so the cap is a perforated outlet cap that is mounted within the outlet end of the second bore 42 for anchoring the biasing spring 48 while allowing the free discharge of brake fluid. A diagonal slot 58 is shown formed in the head of the threaded cap 54 for receiving the blade of a screwdriver for use in turning the threaded cap. In order to prevent discharging the brake fluid from discharging onto the floor from the bore 56 of the one-way check valve 38 during the brake bleeding process, a short length of flexible hose (not shown) would be slipped onto the discharge end of the check valve. The opposite end of this hose would be furnished with a small bottle to collect the brake fluid. Later, the contents of the bottle would be returned to the reservoir of the master brake cylinder (not shown). It will be understood by those skilled in this art that the threaded cap 54 could be provided with a forced fit, which would hold the cap in place, instead of using screw threads as shown. It is a stated objective to provide the cap 54 such that it can be removed at will in the event it would be necessary to disassemble this check valve in order to clean out the parts of foreign matter.

The opposite end of the one-way check valve and coupler assembly 38 has a recessed valve seat 64 formed in the entrance to the longitudinal bore 40. The exterior of this left end of the check valve and coupler assembly 38 is provided with external threads 66 for receiving the adjustable coupler 68 that is in the form of a threaded nut having a central hole having internal threads 70. This adjustable coupler 68 has a hexagonal outer configuration 72, as is best seen in the end view of FIG. 2, for use in cooperation with a crescent wrench for tightening the coupler nut 68 in place, as is to be described.

The outermost end of this threaded nut 68 has a hole that is smaller than the size of the central hole through the nut, and it is slotted from one side in order to form a transverse slot 76 in that one side that also opens up one side or half of the smaller hole so as to create a spaced, three-sided flange 78 having sides 80, 82 and 84. Side flanges 80 and 84 are parallel to each other, while the side flange 82 forms the base of a U-shaped flange 78, as is best seen by the dotted lines of FIG. 2. The transverse slot 76 is arranged parallel to the end face 86 of the coupler nut 68. The width of this transverse slot 76, as seen in the end view of FIG. 2, is wider than the diameter of the central hole through the nut. The width of this transverse slot 76, as seen in the side view of FIG. 3, is slightly greater than the width of the beveled nipple 32, so that it is an easy matter to slip the nipple 32 sideways into the transverse slot 76. This action may be reversed by slipping the three-sided flange 78 behind the rear wall 88 of the beveled nipple 32. When the coupler nut 68 is tightened onto the external threads 66 of the check valve 38, the beveled nipple 32 will be drawn tightly against the recessed valve seat 64 of the check valve 38 so as to make a strong, positive seal between the standard bleeder valve 18 and the combined check valve and coupler 38. Notice that the two parallel side flanges 80 and 84 are spaced apart a distance greater than the diameter of the standard bleeder valve 18, which is shown in cross section in FIG. 2. The transverse slot 76, when viewed from the open side of the coupler nut, plus the open side or half of the smaller hole in the outermost end of the nut appear as a T-shaped slot.

The mid-portion of the body of the combined check valve and coupler assembly 38 is provided with a wrench-engaging surface 92 for use in cooperation with a wrench that may be applied to the hexagonal coupler nut 68 for either tightening or loosening the assembly.

FIG. 3 is just a larger, cross-sectional view of the combination one-way check valve and coupler assembly 38. The fragment of the standard bleeder valve 18 is shown in dotted lines to give a clearer understanding of the nature of the transverse slot 76 in the coupler nut 68 in order to create the three-sided, U-shaped flange 78. The ball valve 46 is shown in its open position, held off of the valve seat 44, which could only occur if there was hydraulic fluid under pressure within the longitudinal bore 40.

Having described above my invention of the use of a combination one-way check valve and coupler assembly for mounting on a standard bleeder valve of a hydraulic wheel brake cylinder, it will readily be apparent to those skilled in this art that by the use of this invention such brakes may be bled, either one wheel at a time, or all four simultaneously, depending on whether the one-way check valve and coupler assembly 38 is assembled on each of the four wheels simultaneously. With the use of this invention, the brake operator need only assemble the check valve and coupler 38 to the standard bleeder valve and open the standard bleeder valve and then position himself within the vehicle and depress the brake pedal, which would serve to force some of the hydraulic fluid and all of the air from the system. Then, when the pressure on the brake pedal was removed, the ball check valve 46 would automatically close due to the action of the compression spring 48; thereby preventing any air from being drawn back into the system before the operator gets out of the car and goes around to each wheel and closes the standard bleeder valve 18.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A combination one-way check valve and coupler assembly adapted for direct locking engagement with a standard hydraulic brake bleeder valve for use by one person operating the brake pedal in bleeding air from wheel brake cylinders on wheeled vehicles without allowing air to reenter the brake cylinder when the brake pedal is released, said one-way check valve comprising:
   a. an elongated valve body having a longitudinal passage extending completely therethrough with an inlet at one end of the body that is furnished with a first recessed valve seat,
   b. said longitudinal passage having a first section of relatively small bore extending inwardly from said inlet end and being furnished with a second recessed valve seat at the innermost end of said first section,
   c. said longitudinal passage having a second section of relatively larger bore that extends from the said second recessed valve seat to an outlet at the opposite end of the said valve body, said second passage section including a movable valve element and a biasing spring that normally holds the said valve element closed on the second recessed valve seat, and a perforated outlet cap mounted within the outlet end of the second bore for anchoring the biasing spring while allowing the free discharge of brake fluid;
   d. and an adjustable coupler means carried by the inlet end of the said valve body, said coupler means being movable between a first open position and adapted for receiving a beveled nipple of a standard brake bleeder valve, and a second closed position which is adapted to clamp the said bleeder valve nipple into sealing engagement with the said first recessed valve seat of the valve body;
   e. said adjustable coupler means comprising an internally threaded nut that is threaded onto the inlet end of the said valve body, the outermost end of the threaded nut having a T-shaped slot formed in one side thereof that is adapted to receive the said beveled nipple of a standard bleeder valve through the slotted side of the nut so that the outermost end of the nut has a three-sided flange that is adapted to engage behind the said nipple so that when the nut is tightened onto the valve body, the said nipple will be drawn into sealing engagement with the said first recessed valve seat so this combination one-way check valve and coupler assembly is mounted directly to a standard brake bleeder valve.

2. The invention as is recited in claim 1, wherein the said valve body has a first wrench-engaging section, and the said threaded nut has a second wrench-engaging section whereby one of said wrench-engaging sections is held from turning while the other wrench-engaging section is turned for locking the one-way check valve directly onto a standard hydraulic brake bleeder valve.

3. The invention as is recited in claim 2, wherein the said beveled nipple of a standard bleeder valve is in the form of a frusto-conical head that is larger than the main body of a standard bleeder valve, wherein the said frusto-conical surface is adapted to seal into the said first recessed valve seat of the said one-way check valve.

* * * * *